United States Patent
Barbieri et al.

(10) Patent No.: US 9,924,504 B2
(45) Date of Patent: Mar. 20, 2018

(54) JOINT PDCCH/PDSCH SCHEDULING TECHNIQUES TO ENHANCE PDSCH INTERFERENCE CANCELLATION

(71) Applicant: QUALCOMM Incorporated, San Diego, CA (US)

(72) Inventors: Alan Barbieri, La Jolla, CA (US); Tao Luo, San Diego, CA (US)

(*) Notice: Subject to any disclaimer, the term of this patent is extended or adjusted under 35 U.S.C. 154(b) by 414 days.

(21) Appl. No.: 14/507,791

(22) Filed: Oct. 6, 2014

(65) Prior Publication Data

US 2015/0098421 A1 Apr. 9, 2015

Related U.S. Application Data

(60) Provisional application No. 61/887,917, filed on Oct. 7, 2013.

(51) Int. Cl.
| | |
|---|---|
| *H04W 4/00* | (2009.01) |
| *H04W 72/04* | (2009.01) |
| *H04W 52/14* | (2009.01) |
| *H04W 52/24* | (2009.01) |
| *H04W 72/08* | (2009.01) |
| *H04W 88/02* | (2009.01) |

(52) U.S. Cl.
CPC ....... *H04W 72/042* (2013.01); *H04W 52/143* (2013.01); *H04W 52/243* (2013.01); *H04W 72/082* (2013.01); *H04W 88/02* (2013.01)

(58) Field of Classification Search
CPC ............. H04W 72/042; H04W 52/143; H04W 72/082; H04W 52/243; H04W 88/02
See application file for complete search history.

(56) References Cited

U.S. PATENT DOCUMENTS

| | | | |
|---|---|---|---|
| 2012/0236736 A1* | 9/2012 | Frank | H04W 24/04 370/252 |
| 2013/0051240 A1* | 2/2013 | Bhattad | H04L 5/005 370/241 |

(Continued)

FOREIGN PATENT DOCUMENTS

| | | |
|---|---|---|
| WO | 2013066935 A1 | 5/2013 |
| WO | 2013081525 A1 | 6/2013 |

OTHER PUBLICATIONS

Alcatel-Lucent et al., "Technology Aspects for Heterogeneous Network for LTE-A", 3GPP Draft; R1-094626_HTN TECHNICALISSUES Final, 3rd Generation Partnership Project (3GPP), Mobile Competence Centre; 650, Route Des Lucioles; F-06921 Sophia-Antipolis Cedex; France, No. Jeju; Nov. 9, 2009, Nov. 9, 2009 (Nov. 9, 2009), pp. 1-3, XP050389034, [retrieved on Nov. 3, 2009].

(Continued)

*Primary Examiner* — Ayaz Sheikh
*Assistant Examiner* — Hai-Chang Hsiung
(74) *Attorney, Agent, or Firm* — Arent Fox, LLP and Qualcomm, Incorporated

(57) ABSTRACT

A method, an apparatus, and a computer program product for wireless communication are provided. The apparatus configures a first downlink (DL) control channel for a user equipment (UE) being served by the first transmission point, the configuration facilitating decoding of the first DL control channel by at least one UE being served by a second transmission point, and transmits the first DL control channel.

28 Claims, 16 Drawing Sheets

(56) References Cited

U.S. PATENT DOCUMENTS

| | | | |
|---|---|---|---|
| 2013/0114514 A1* | 5/2013 | Nissila | H04L 5/0051 |
| | | | 370/329 |
| 2013/0188558 A1 | 7/2013 | Nam et al. | |
| 2013/0242750 A1 | 9/2013 | Baker et al. | |
| 2013/0242882 A1* | 9/2013 | Blankenship | H04W 72/042 |
| | | | 370/329 |
| 2014/0233466 A1* | 8/2014 | Pourahmadi | H04L 27/2613 |
| | | | 370/329 |
| 2015/0271788 A1* | 9/2015 | Kim | H04L 5/0053 |
| | | | 370/329 |

OTHER PUBLICATIONS

International Search Report and Written Opinion—PCT/US2014/059510—ISA/EPO—dated Mar. 6, 2015.

* cited by examiner

JOINT PDCCH/PDSCH SCHEDULING TECHNIQUES TO ENHANCE PDSCH INTERFERENCE CANCELLATION

CROSS-REFERENCE TO RELATED APPLICATION

This application claims the benefit of U.S. Provisional Application Ser. No. 61/887,917 entitled "JOINT PDCCH/PDSCH SCHEDULING TECHNIQUES TO ENHANCE PDSCH INTERFERENCE CANCELLATION" and filed on Oct. 7, 2013, which is expressly incorporated by reference herein in its entirety.

BACKGROUND

Field

The present disclosure relates generally to communication systems, and more particularly, to joint PDCCH/PDSCH scheduling techniques to enhance PDSCH interference cancellation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus configures a first downlink (DL) control channel for a user equipment (UE) being served by the first transmission point, the configuration facilitating decoding of the first DL control channel by at least one UE being served by a second transmission point, and transmits the first DL control channel.

DETAILED DESCRIPTION

Figure 1:
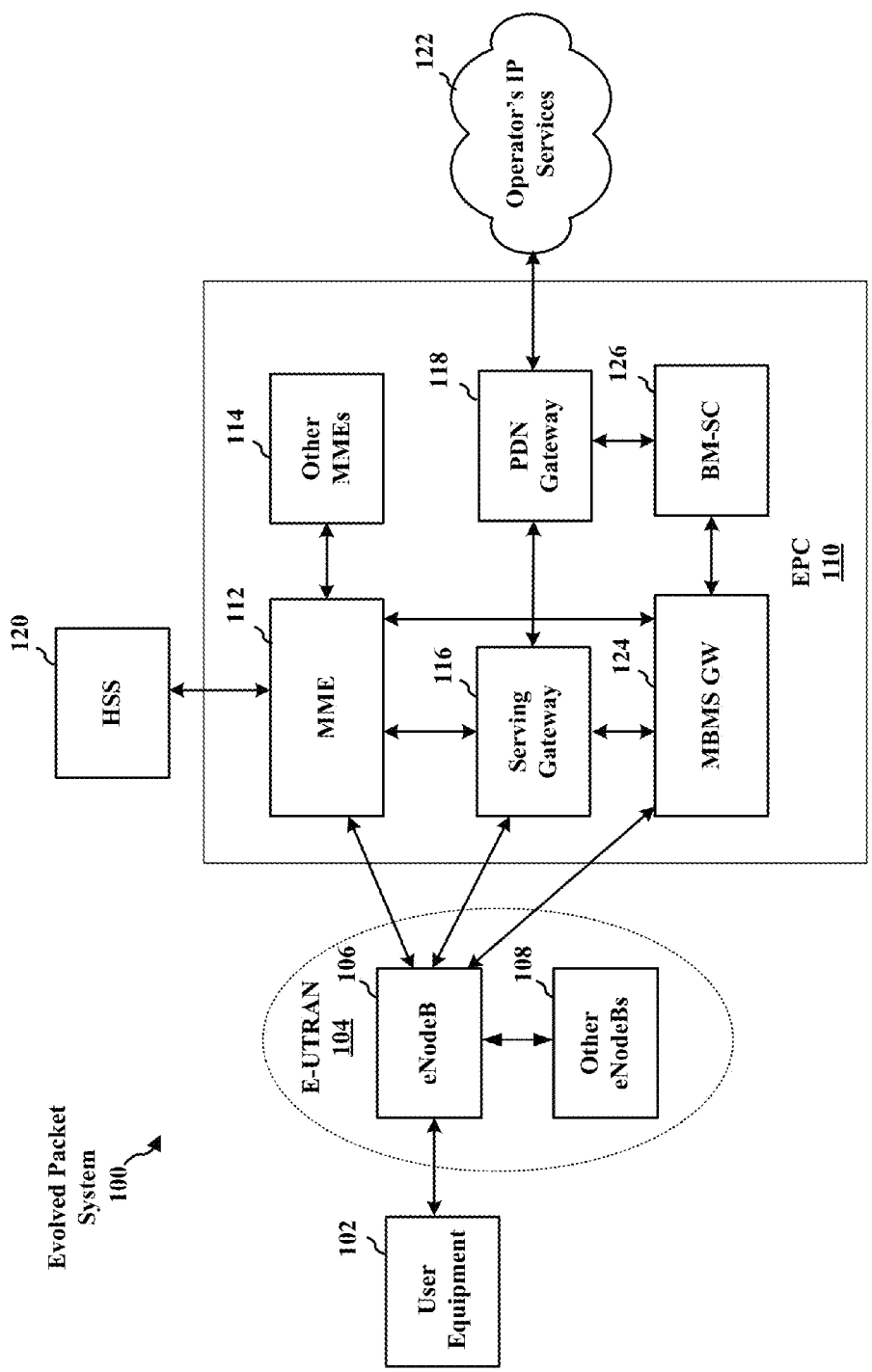
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a transmission point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
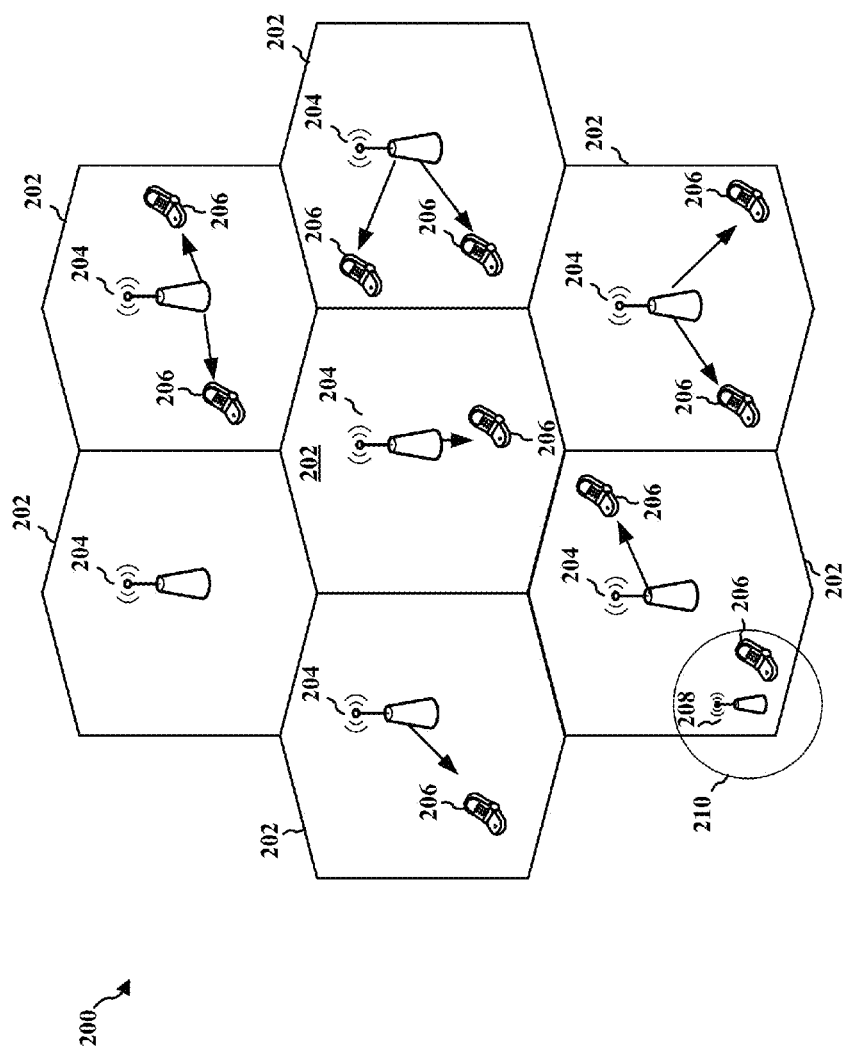
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques.

By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
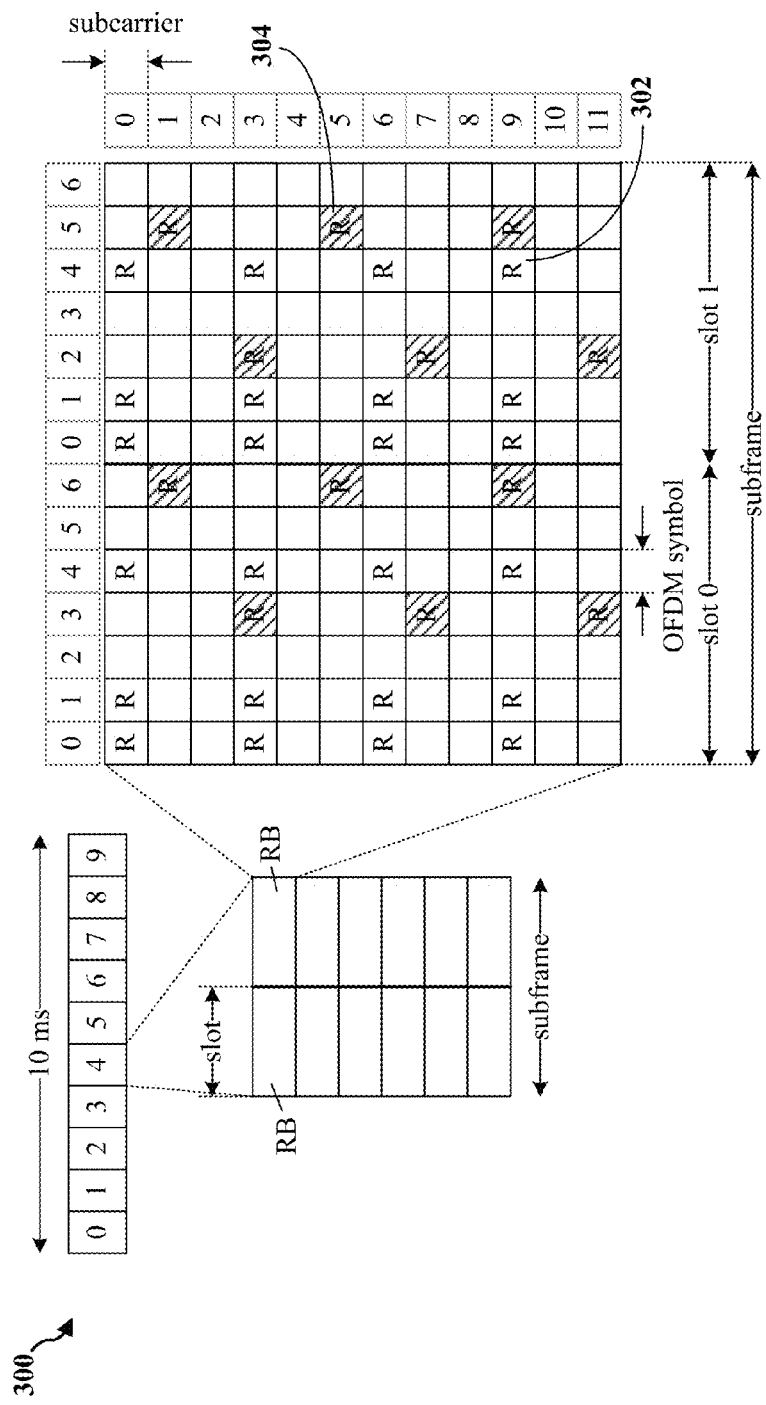
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
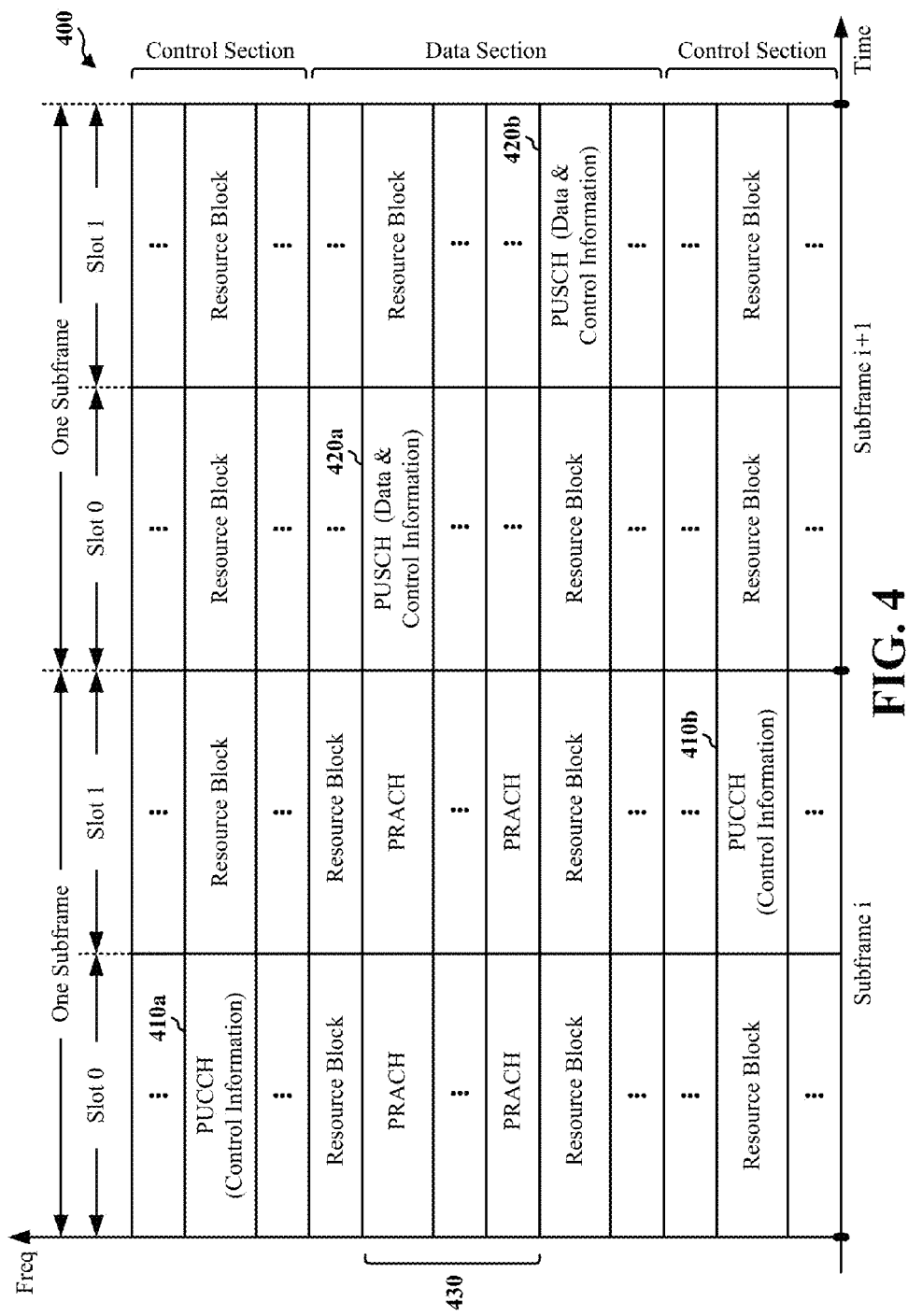
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
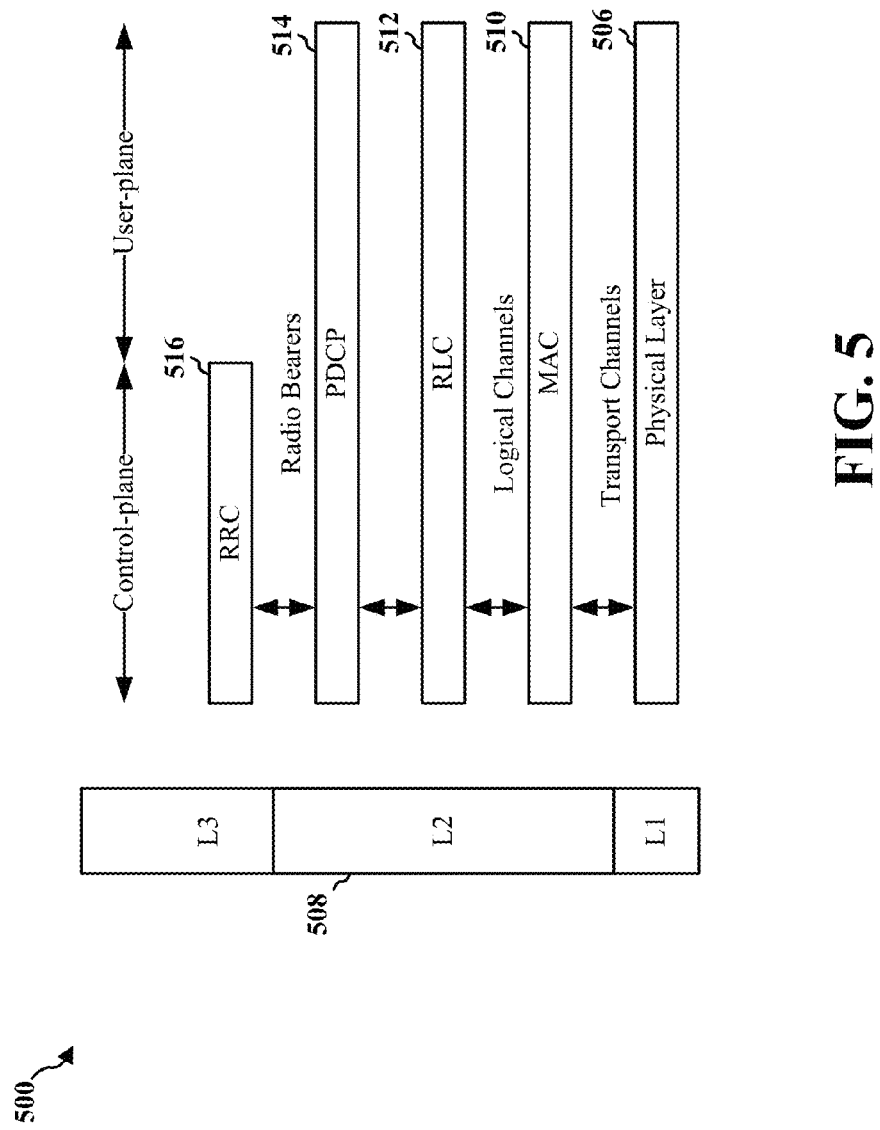
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
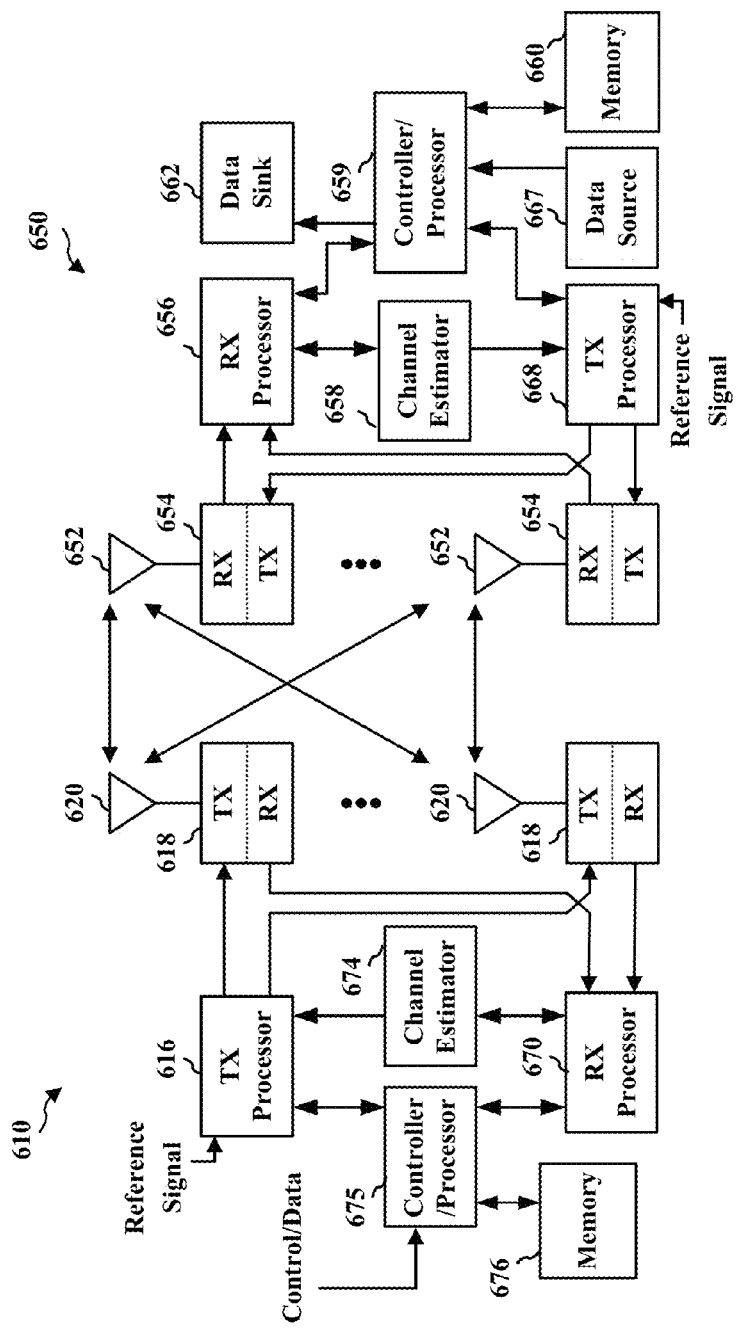
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656.

The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
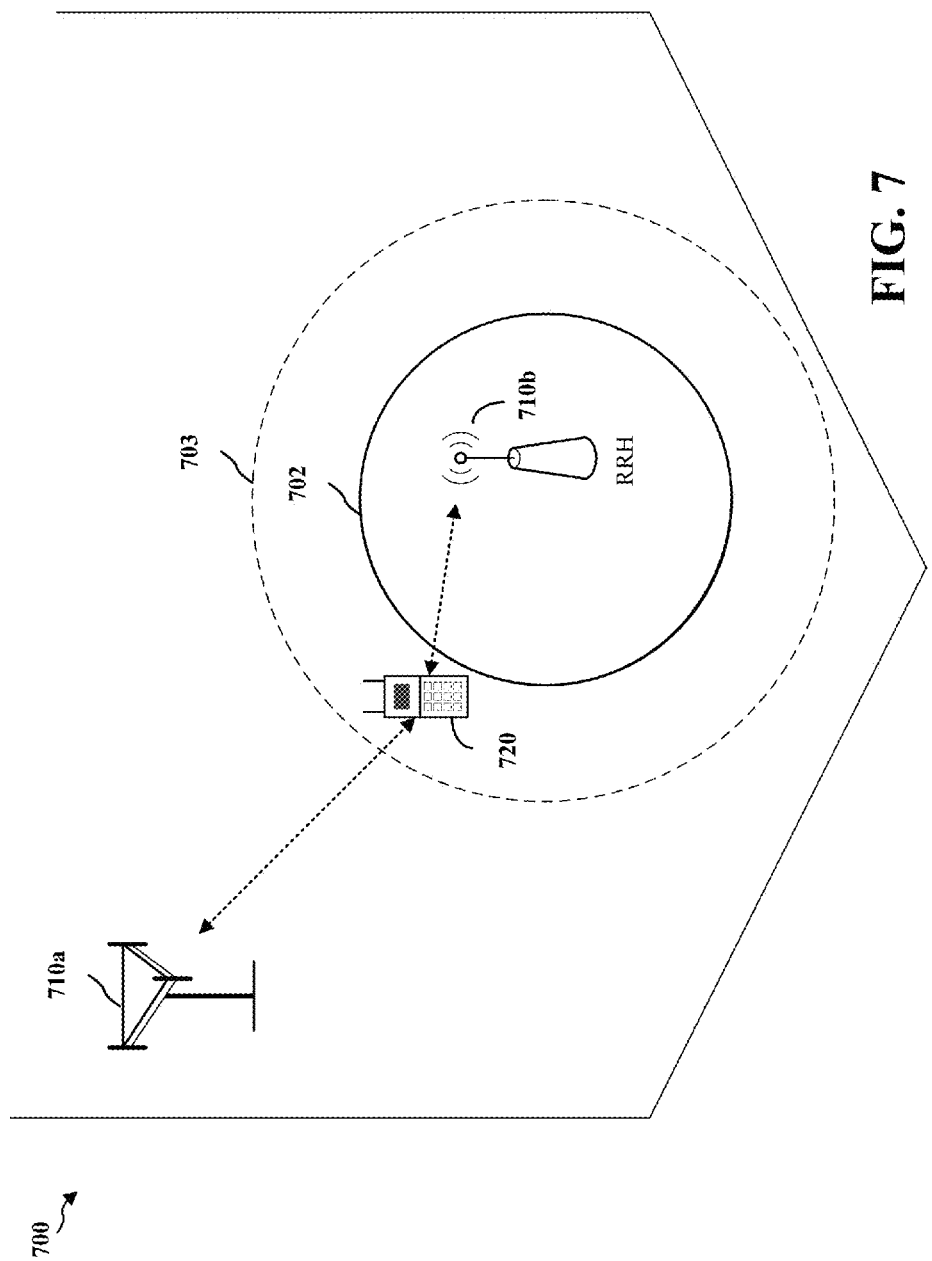
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancelation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

A UE currently being served by a serving cell (also referred to as a serving eNB) may be configured to decode downlink control channels (e.g., a physical downlink control channel (PDCCH)) of a neighbor cell (also referred to as an interfering cell or interfering eNB). For example, the UE may decode PDCCH to determine downlink grants. Decoding of the PDCCH of a neighbor cell by the UE may be beneficial to the UE. For example, the UE may determine the PDSCH interference characteristics (e.g., resource bock (RB) allocations, modulation format, spatial scheme, etc.) of the neighbor cell. The UE may be required to decode or blind detect the PDCCH of a neighbor cell to perform various kinds of PDSCH interference suppression (e.g., codeword-level PDSCH interference cancellation (PDSCH-IC), symbol-level PDSCH-IC, etc.).

Blind decoding of a PDCCH of a neighbor cell by the UE is complex because radio network temporary identifiers (RNTIs) used by the neighbor cell are unknown to the UE. Such blind decoding may be avoided if the network (e.g., the serving cell of the UE) provides additional information (e.g., network assistance) to assist the UE with interference suppression. Since the RNTIs used by a neighbor cell are unknown to the UE, the search space (number of possible) of RNTIs associated with the neighbor cell is also unknown to the UE. Therefore, all control channel elements (CCEs) should be considered by the UE trying to decode a neighbor cell's PDCCH, in the absence of any such additional information. Evaluation of all CCEs increases complexity (due to the large number of possible necessary blind decodes), potentially unfavorable false alarm probability (FAP), and misdetection probability (MDP).

Figure 8:
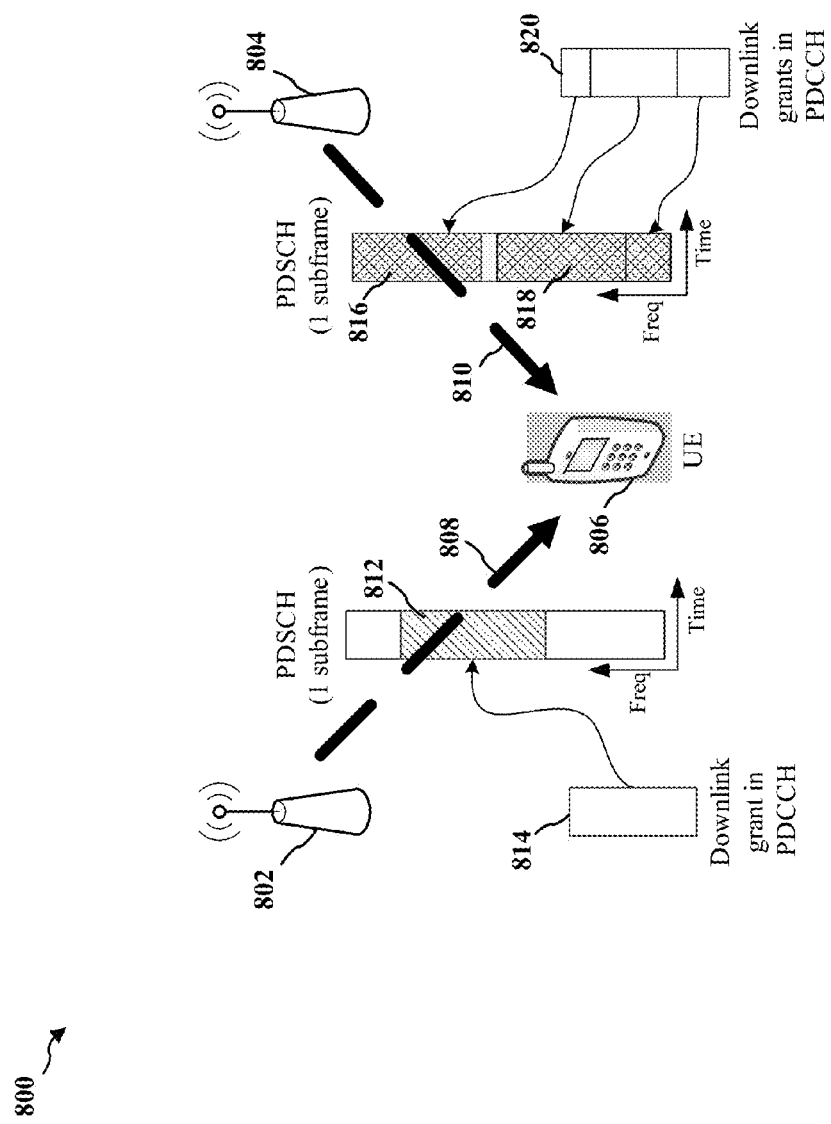
FIG. 8 is a diagram illustrating a communication network.

FIG. 8 is a diagram 800 illustrating a communication network. The communication network includes a serving transmission point 802, an interfering transmission point 804, and a UE 806. In an aspect, the serving transmission point 802 may be a cell that serves the UE 806 and the interfering transmission point 804 may be an interfering cell that serves another UE (not shown in FIG. 8). In such aspect, and as shown in FIG. 8, the UE 806 receives DL signal 808 from the serving transmission point 802 and interfering DL signal 810 from the interfering transmission point 804.

In the configuration of FIG. 8, a PDSCH for the UE 806 included in RB allocation 812 in the DL signal 808 is interfered by PDSCH(s) included in RB allocations (e.g., RB allocations 816 and 818) in the interfering DL signal 810 from the interfering transmission point 804. Therefore, there may be collisions with multiple independent PDSCHs if there is no alignment of PDSCH resources. For example, the RB allocation 812 may be determined from a downlink grant in the PDCCH 814 and the RB allocations 816 and 818 may be determined from the downlink grants in the PDCCH 820.

In an aspect, scheduling enhancements belonging to either one of the following categories may be made: PDSCH scheduling enhancements or joint PDCCH/PDSCH scheduling enhancements. In an aspect, such scheduling enhancements may or may not affect the PDCCH scheduling closed loop.

Figure 9:
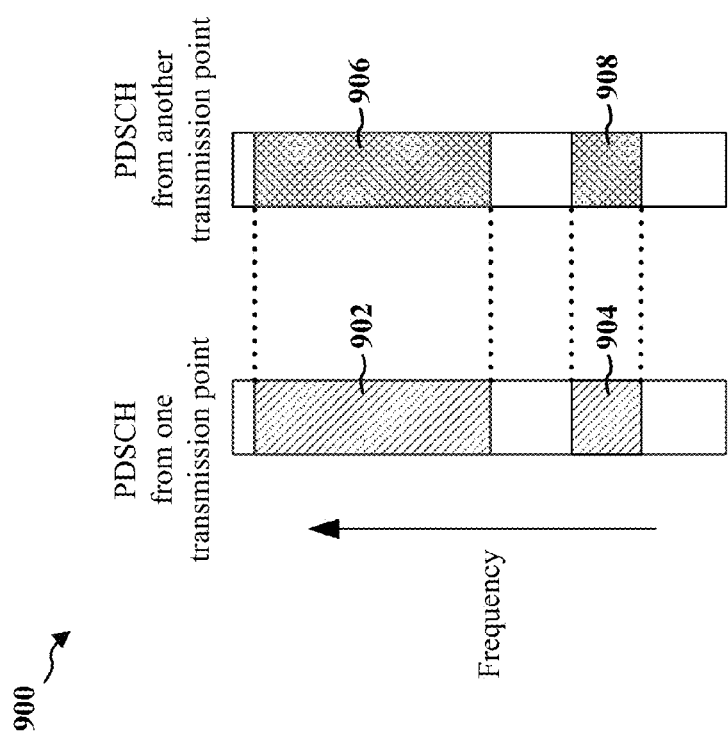
FIG. 9 is a diagram illustrating PDSCH scheduling enhancements.

FIG. 9 is a diagram 900 illustrating PDSCH scheduling enhancements. FIG. 9 includes a PDSCHs 902 and 904 from a one transmission point (e.g., a serving transmission point) and PDSCHs 906 and 908 from another transmission point (e.g., an interfering transmission point). As shown in FIG. 9, the PDSCH 902 from the serving transmission point is aligned with the PDSCH 906 from the interfering transmission point, and the PDSCH 904 from the serving transmission point is aligned with the PDSCH 908 from the interfering transmission point. Alternatively stated, the resources allocated for the PDSCH (e.g., PDSCH 906) from the interfering transmission point are configured to be the same as the resources allocated for the PDSCH (e.g., PDSCH 902) from the serving transmission point, and the resources allocated for the PDSCH 908 from the interfering transmission point are configured to be the same as the resources allocated for the PDSCH 904 from the serving transmission point. In an aspect, such alignment minimizes the number of different PDSCHs which may collide. For example, if only one PDSCH collides (e.g., interferes) with the PDSCH intended for the UE, only one PDCCH grant needs to be decoded by the UE to carry out neighbor PDDCH decoding. By comparison, with reference to the configuration in FIG. 8, the PDSCH 812 intended for the UE 806 is interfered by two separate PDSCHs (e.g., PDSCHs 816 and 818), in addition to some empty RBs, which is problematic because it requires multiple decodes to perform suppression and may still result is different signal quality across the resource block.

Figure 10:
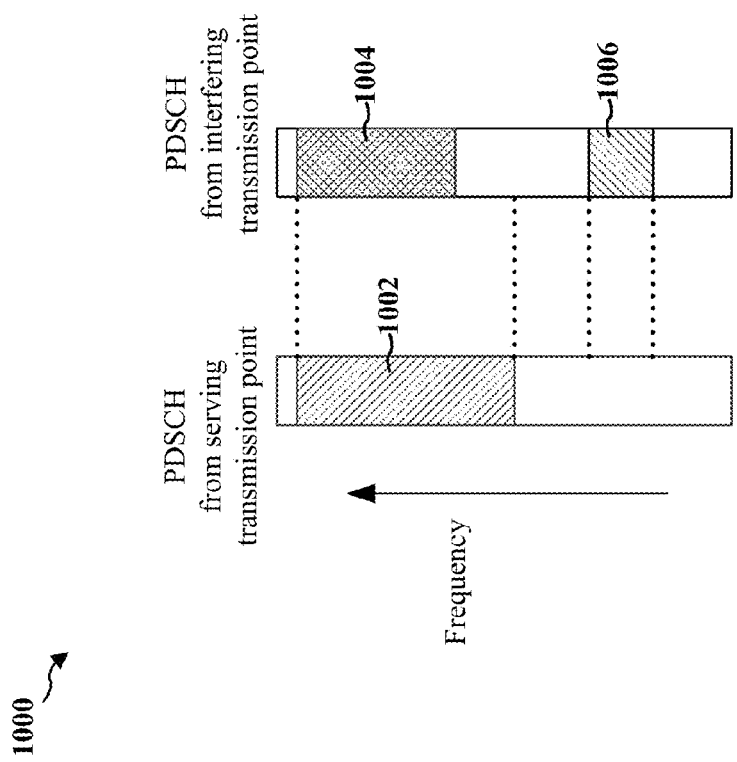
FIG. 10 is a diagram illustrating Joint PDCCH/PDSCH scheduling enhancements.

FIG. 10 is a diagram 1000 illustrating joint PDCCH/PDSCH scheduling enhancements. FIG. 10 includes a PDSCH 1002 from a serving transmission point (e.g., a serving cell) and PDSCHs 1004 and 1006 from an interfering transmission point (e.g., an interfering cell). In the configuration of FIG. 10, the PDSCH 1002 is intended for the UE and the interfering transmission point transmits a (fully or partially) colliding PDSCH (e.g., PDSCH 1004). Other PDSCHs may be transmitted (e.g., PDSCH 1006), but the UE may or may not be interested in knowing resources and characteristics of those additional interfering signals.

With neighbor PDCCH decoding, the UE tries to decode the PDCCH of the interfering transmission point. Such decoding of the PDCCH is beneficial because if the downlink grant corresponding to the PDSCH 1004 is decoded successfully, the UE may suppress the impact of interfering PDSCH 1004 to PDSCH 1002. For example, the UE may determine parameters including the RB allocation, spatial scheme, pre-coding matrix indicator (PMI), code rate and redundancy version, etc. Otherwise, the UE may have to blindly estimate one or more of such parameters.

In an aspect, a scheduler maximizes the probability that the UE experiencing interference from a neighbor transmission point can successfully decode the PDCCH corresponding to an interfering PDSCH. In an aspect, the PDCCH corresponding to the interfering PDSCH is transmitted with an increased power (e.g., an increased traffic to pilot ratio (TPR)). For example, such an increase in power may enhance PDCCH blind decoding performance. In another aspect, the PDCCH corresponding to the interfering PDSCH is transmitted with a large aggregation level. A large aggregation level implies lower code rate (e.g., more robustness). In general, TPR and aggregation levels may be selected based on some information (if available) about the radio conditions (e.g., path loss, RSRP, or the like) from the interfering transmission point to the considered UE.

In an aspect, RNTI coordination may be implemented. In RNTI coordination, an interfering transmission point chooses the UE to schedule on the colliding PDSCH resources so that the RNTI of the selected UE implies that its PDCCH can be transmitted on the same search space of the interfered UE. Therefore, the interfered UE does not have to search the entire CCE space, but only its own search space, where the interfered UE will find both its DL grant and the DL grant(s) of the main interferer(s). This approach may substantially reduce complexity and FAP. In an aspect, transmission points may coordinate so as to avoid collisions between the two PDCCHs. A serving transmission point may refrain from transmitting any other PDCCH on the CCEs used by the interfering transmission point for transmission of a PDCCH grant.

In an aspect, aggregation level coordination may be implemented. In aggregation level coordination, the interfering transmission point (e.g., an interfering cell) chooses an aggregation level for the transmission of a first PDCCH which is equal to or larger than the aggregation level used by a serving transmission point (e.g., serving cell) for transmission of a second PDCCH to a UE being served by the serving transmission point. For example, the UE being served by the serving transmission point first decodes its own DL grant, determines the aggregation level, and searches over all the CCE assuming the determined aggregation level. This approach may substantially reduce complexity and FAP.

In an aspect, the network may selectively apply one or more of techniques (e.g., for which PDSCH/PDCCH pairs) described herein. In an aspect, the network knows which UEs in the network have the capability to decode a neighbor PDCCH, and applies any of the above ideas only for those PDSCHs intended to UEs with such capability. In another aspect, if the capability of a UE to decode neighbor PDCCH is unknown, the network applies one or more of the techniques described herein every time a strong interference condition occurs between two or more transmitted PDSCHs. In an aspect, applicability may be conditioned on the number of active UEs. For example, if very few UEs are active at a given time, a system performance degradation might occur (because of lack of degrees of freedom for choosing the UEs). Various aspects include scenarios where the two transmission points can be geographically disparate or geographically co-located (i.e, located in the same location). Furthermore, while aspects herein are provided with two transmission points, aspects envisioned may include transmission coordination among any number of transmission points.

It should be noted that PDSCH interference may also come from the same cell, when multi-user multiple-input and multiple-output (MU-MIMO) is used (e.g., more than one UE served by the same cell on the same resources). The same techniques described herein are also applicable in this scenario. For example, the serving transmission point 802 and interfering transmission point 804 may be associated with the same cell and may share the same cell ID. In such example, the serving transmission point 802 and the interfering transmission point may be configured to coordinate with one another. Furthermore, as indicated above, the transmission points can be geographically disparate or geographically co-located (e.g., i.e, located in the same location). For example, such coordination may be achieved via a coordinated multipoint (CoMP) cluster with fiber backhaul, or a macro/pico network with low-latency X2. Further apects are also envisioned where any number of transmission points may coordinate transmissions, where none, some, or all transmission points employ the same cell ID(s).

Enhanced PDCCH (EPDCCH) locations (subframes, PRBs) are UE-specific and higher-layer signaled. Fully blind detection of a neighbor EPDCCH is difficult for a UE. Decoding of a neighbor EPDCCH requires knowledge (or detection) of the following parameters for all UE-specific EPDCCHs transmitted by an interfering transmission point (e.g., an interfering cell): locations (PRBs, subframe patterns) of the ePDCCH sets, whether each set is distributed or localized, a virtual cell identification (VCID) for each set, Quasi Co-Location (QCL) information for each set (if TM10 is configured), a starting OFDM symbol, knowledge of near zero power (NZP) channel state information reference symbol (CSI-RS) locations transmitted by the interfering cell, if they collide with any of the EPDCCH sets, RNTI, transmission mode (TM), aggregation level, etc. (as for interferer PDCCH decoding).

In an aspect, decoding of a neighbor ePDCCH by a UE may be simplified. In an aspect, the search spaces between a serving cell and interfering cell may be matched. For example, the serving cell and interfering cell may configure the same physical resource blocks (PRBs) and subframe patterns. Such configuration may be performed either for all UEs or for UEs that may end up being co-scheduled (implies interaction b/w PDSCH and ePDCCH schedulers). For example, if $UE_{\{i,0\}}$ and $UE_{\{j,0\}}$ are configured with sets A, B, and $UE_{\{i,1\}}$ and $UE_{\{j,1\}}$ are configured with sets C, D (i, j denote cell index), PDSCH for $UE_{\{i,0\}}$ will not collide (PDSCH scheduling restriction) with PDSCH for $UE_{\{j,1\}}$. Distributed/localized attribute and/or the starting OFDM symbol may also be constrained to be the same between serving and interfering ePDCCHs. In an aspect, if the same VCID is used from both transmission points for their respective ePDCCHs, only one channel estimate is required. Use of the same VCID may be applicable to all UEs or only UEs that may end up being co-scheduled.

As discussed supra, a UE being served by a serving transmission point (e.g., a serving cell) may decode PDCCHs from an interfering transmission point (e.g., an interfering cell). In an aspect, only the UE-specific search space is searched by a UE. Therefore, a scheduler may ensure that DL grants for UEs co-scheduled by the interfering transmission point will fall in the same search space. In an aspect, power and/or aggregation level control loop of the interfering transmission point may take into account interfered UEs. The interfering transmission point tries to make both its own UE and other UEs associated with other eNBs decode the control channel (e.g., PDCCH or EPDCCH). In an aspect, decoding the control channel of the interfering transmission point may be a capability of a UE and exchange signaling between UE and eNB. For example, schedulers may consider whether a UE is capable of decoding PDCCH of the interfering transmission point into account when deciding whether and for which UE to apply the techniques described herein. In an aspect, schedulers take into account both PDSCH-related metrics (e.g., CQI per subband) and PDCCH-related metrics (aggregation levels, RNTI/search space, etc.).

Figure 11:
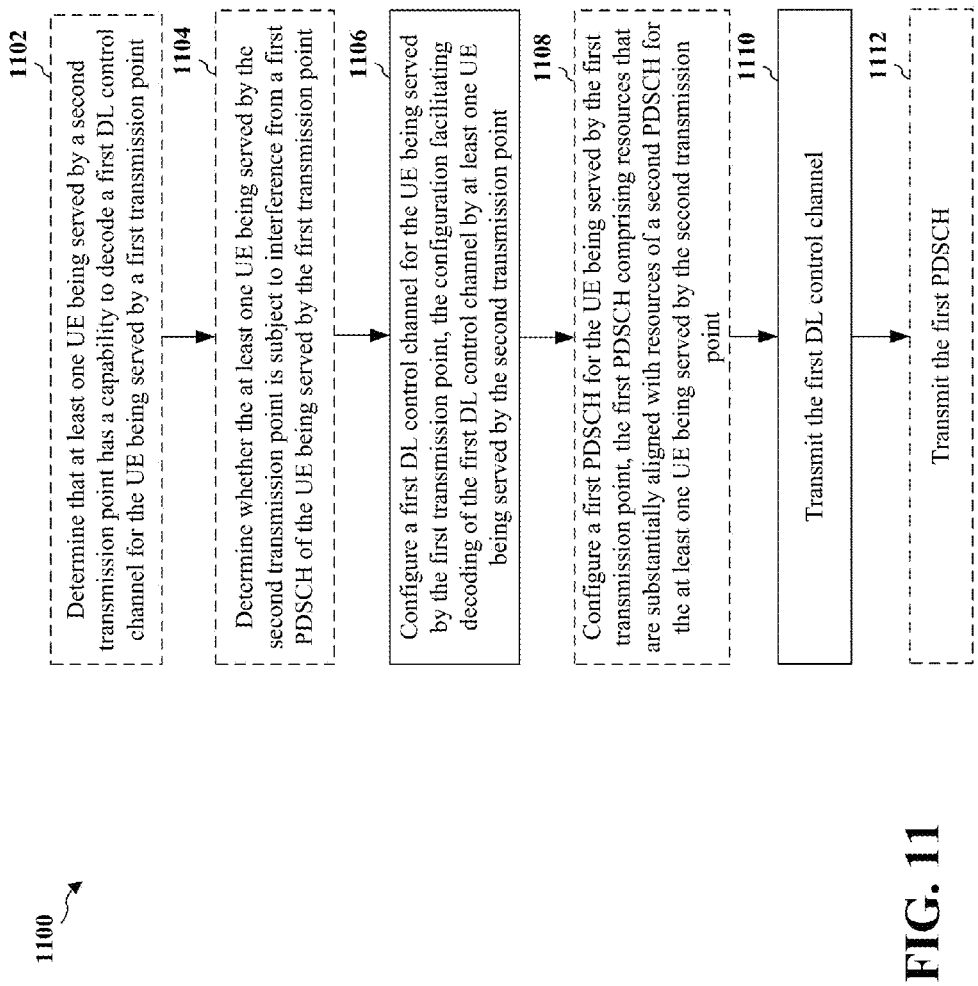
FIG. 11 is a flow chart of a method of wireless communication.

FIG. 11 is a flow chart 1100 of a method of wireless communication. The method may be performed by a first transmission point (also referred to as an interfering eNB or an interfering base station). For example, the first transmission point may be the interfering transmission point 804 in FIG. 8. It should be understood that the steps indicated by dotted lines in FIG. 11 represent optional steps.

At step 1102, the first transmission point determines that the at least one UE being served by a second transmission point comprises a capability to decode a first DL control channel for the UE being served by the first transmission point. For example, with reference to FIG. 8, the second transmission point may be the serving transmission point 802 and the at least one UE being served by the second transmission point may be the UE 806. In an aspect, the first and second transmission points may be separate base stations. In another aspect, the first and second transmission points may be associated with the same cell and may have the same cell ID. These various aspects include scenarios where the transmission points may be geographically disparate or geographically co-located. In an aspect, the first DL control channel is a PDCCH corresponding to a first PDSCH that interferes with a second PDSCH for the at least one UE being served by the second transmission point.

At step 1104, the first transmission point determines whether the at least one UE being served by the second transmission point is subject to interference from a first PDSCH of the UE being served by the first transmission point.

At step 1106, the first transmission point configures the first DL control channel for the UE being served by the first transmission point, the configuration facilitating decoding of the first DL control channel by at least one UE being served by the second transmission point. In an aspect, the first transmission point configures the first DL control channel by increasing a transmit power of the first DL control channel based on one or more radio conditions of the at least one UE to enable detection of the DL control channel by the at least one UE. In an aspect, the first transmission point configures the first DL control channel by allocating resources for the first DL control channel which are included in a search space monitored by the at least one UE. For example, such allocation may involve selecting a UE among schedulable UEs comprising parameters that allow corresponding control information to be allocated in a selected search space.

In an aspect, the first transmission point configures the first DL control channel by allocating a first number of resources for the first DL control channel, the first number of resources being equal to or greater than a second number of resources allocated to the at least one UE by the second transmission point for a second DL control channel. In an aspect, the first transmission point configures a first PDSCH for the UE being served by the first transmission point, the first PDSCH comprising resources that are substantially aligned with resources of a second PDSCH for the at least one UE being served by the second transmission point.

In an aspect, the first DL control channel is an EPDCCH, and the first transmission point configures a first search space of the UE being served by the first transmission point to be same as a second search space of the at least one UE being served by the second transmission point. In an aspect, the first DL control channel is an EPDCCH, and the first transmission point configures the EPDCCH to be transmitted with a first virtual cell identification (VCID) that is same as a second VCID used by the second transmission point.

At step 1108, the first transmission point configures a first PDSCH for the UE being served by the first transmission point, the first PDSCH including resources that are substantially aligned with resources of a second PDSCH for the at least one UE being served by the second transmission point.

At step 1110, the first transmission point transmits the first DL control channel. In an aspect, the first transmission point transmits the first DL control channel with the increased transmit power.

Finally, at step 1112, the first transmission point transmits the first PDSCH.

Figure 12:
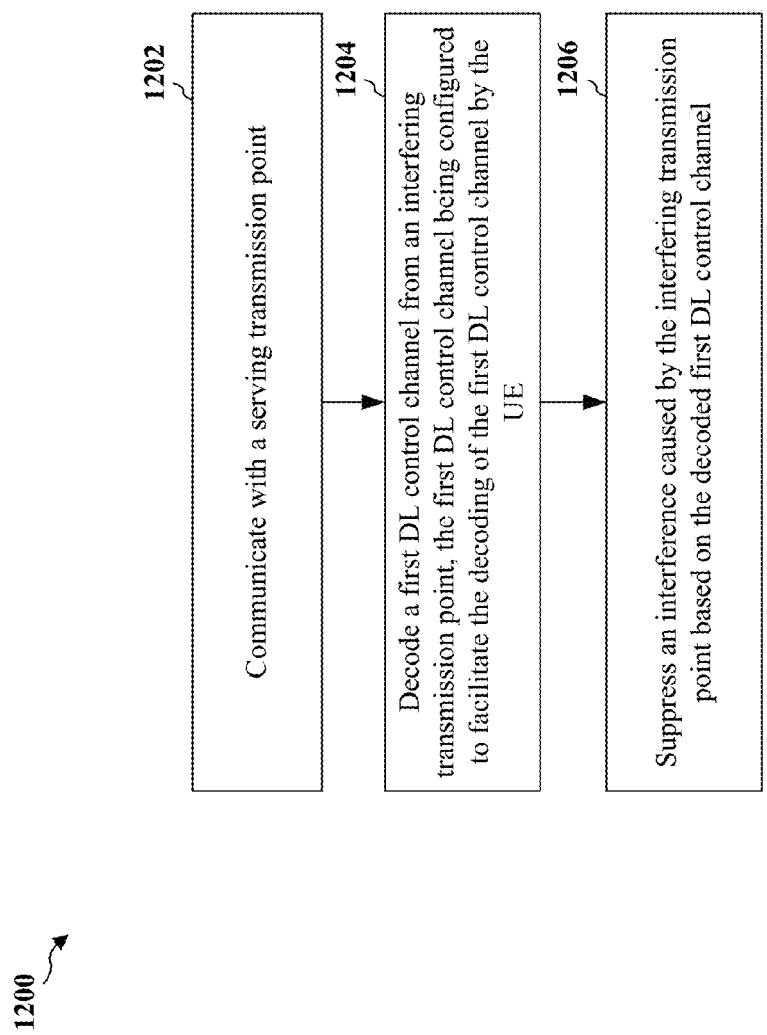
FIG. 12 is a flow chart of a method of wireless communication.

FIG. 12 is a flow chart 1200 of a method of wireless communication. The method may be performed by a UE, such as UE 806 in FIG. 8. At step 1202, the UE communicates with a serving transmission point (also referred to as a serving base station). For example, with reference to FIG. 8, the serving transmission point may be the serving transmission point 802. For example, the UE may communicate with the serving transmission point by sending UL transmissions to the serving transmission point and receiving DL transmissions from the serving transmission point. In an aspect, one or more transmissions from an interfering transmission point may cause interference to the DL transmissions (e.g., a PDSCH in the DL transmission) from the serving transmission point. For example, with reference to FIG. 8, the interfering transmission point may be the interfering transmission point 804. In an aspect, the serving transmission point and interfering transmission point may be separate base stations. In another aspect, serving transmission point and interfering transmission point may be associated with the same cell and may have the same cell ID. In an aspect, the UE may indicate to the serving transmission point whether the UE is subject to interference from a first PDSCH of another UE being served by the interfering transmission point. In an aspect, the UE may communicate to the serving transmission point whether the UE has a capability to decode a first DL control channel for another UE being served by the interfering transmission point.

At step 1204, the UE decodes a first DL control channel from the interfering transmission point, the first DL control channel being configured to facilitate the decoding of the first DL control channel by the UE. In an aspect, the first DL control channel is configured to have an increased transmit power based on one or more radio conditions of the UE to enable detection of the DL control channel by the UE. In an aspect, the first DL control channel is allocated resources which are included in a search space monitored by UE. In an aspect, the first DL control channel is allocated a first number of resources, where the first number of resources are equal to or greater than a second number of resources allocated to the UE by the serving transmission point for a second DL control channel. In an aspect, the UE being served by the serving transmission point receives a first PDSCH. The first PDSCH is intended for another UE being served by the interfering transmission point and is configured with resources that are substantially aligned with resources of a second PDSCH for the UE being served by the serving transmission point. In an aspect, the first DL control channel is an EPDCCH and a search space of another UE being served by the interfering transmission point is configured to be the same as the search space of the UE being served by the serving transmission point. In an aspect, the first DL control channel is an EPDCCH transmitted with a first VCID that is the same as a second VCID used by the serving transmission point.

At step 1206, the UE cancels an interference caused by the interfering transmission point based on the decoded first DL control channel. For example, the UE may use the interference characteristics (e.g., resource bock (RB) allocations, modulation format, spatial scheme, etc.) that may be determined from the decoded first DL control channel of the interfering transmission point and perform interference cancellation using such interference characteristics.

Figure 13:
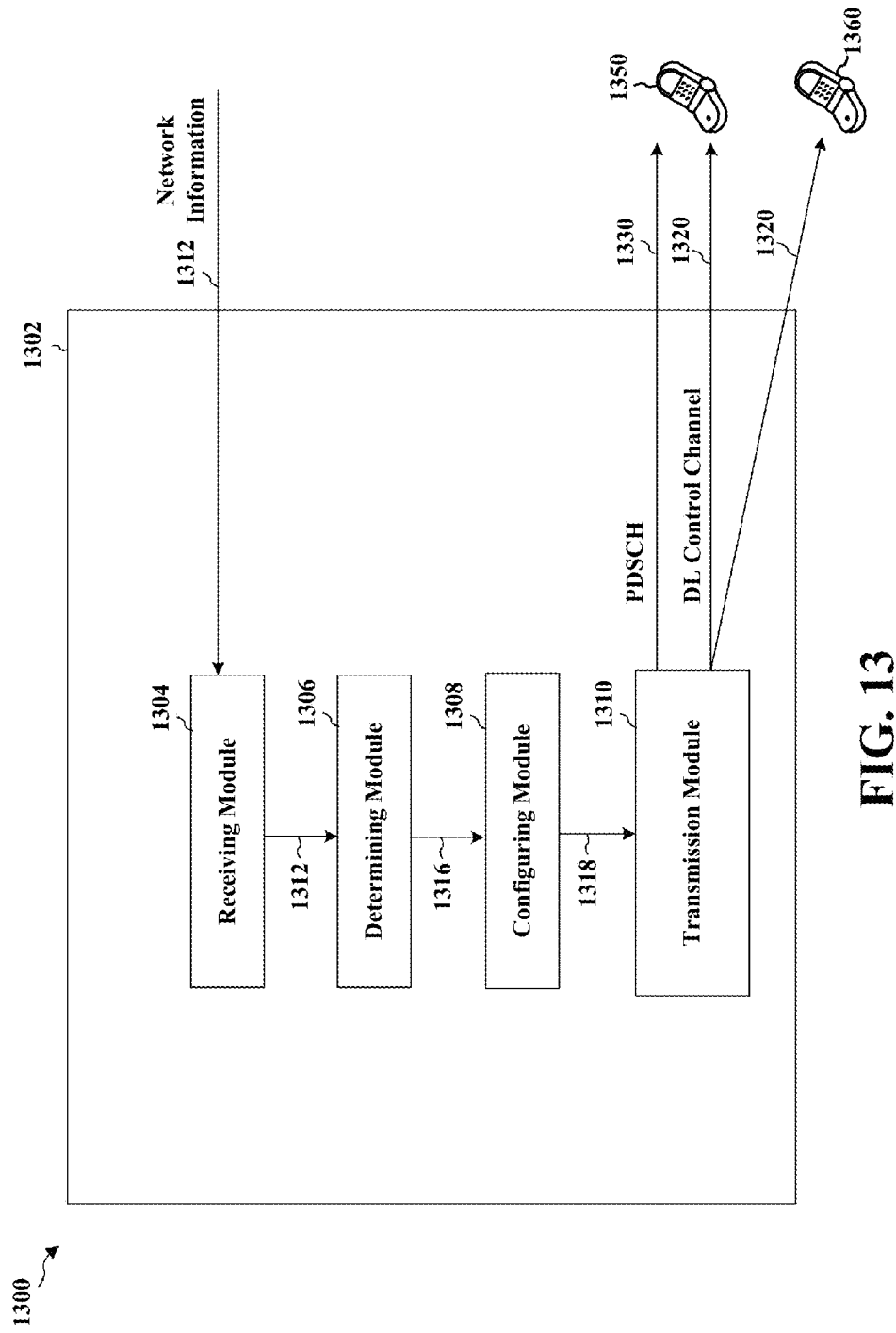
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a first transmission point (e.g., an interfering transmission point). The apparatus includes a receiving module 1304 that receives network information 1312 indicating that the at least one UE 1360 being served by a second transmission point (e.g., a serving transmission point) has a capability to decode the first DL control channel 1320 for the UE 1350 being served by the first transmission point. The apparatus further includes a determining module 1306 that determines that the at least one UE 1360 being served by the second transmission point has a capability to decode the first DL control channel 1320 for the UE 1350 being served by the first transmission point based on the network information 1312. The determining module 1306 further determines whether the at least one UE 1360 being served by the second transmission point is subject to interference from a first PDSCH 1330 of the UE 1350 being served by the first transmission point. The apparatus further includes a configuring module 1308 that configures a first DL control channel 1320 for the UE 1350 being served by the first transmission point based on the determination 1316, the configuration facilitating decoding of the first DL control channel 1320 by at least one UE 1360 being served by the second transmission point. The configuring module 1308 further configures the first PDSCH 1330 for the UE 1350 being served by the first transmission point, the first PDSCH including resources that are substantially aligned with resources of a second PDSCH for the at least one UE being served by the second transmission point. The apparatus further includes a transmission module 1310 that transmits the first DL control channel 1320 and/or the first PDSCH 1330 based on the configurations 1318 from the configuring module 1308.

The apparatus may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
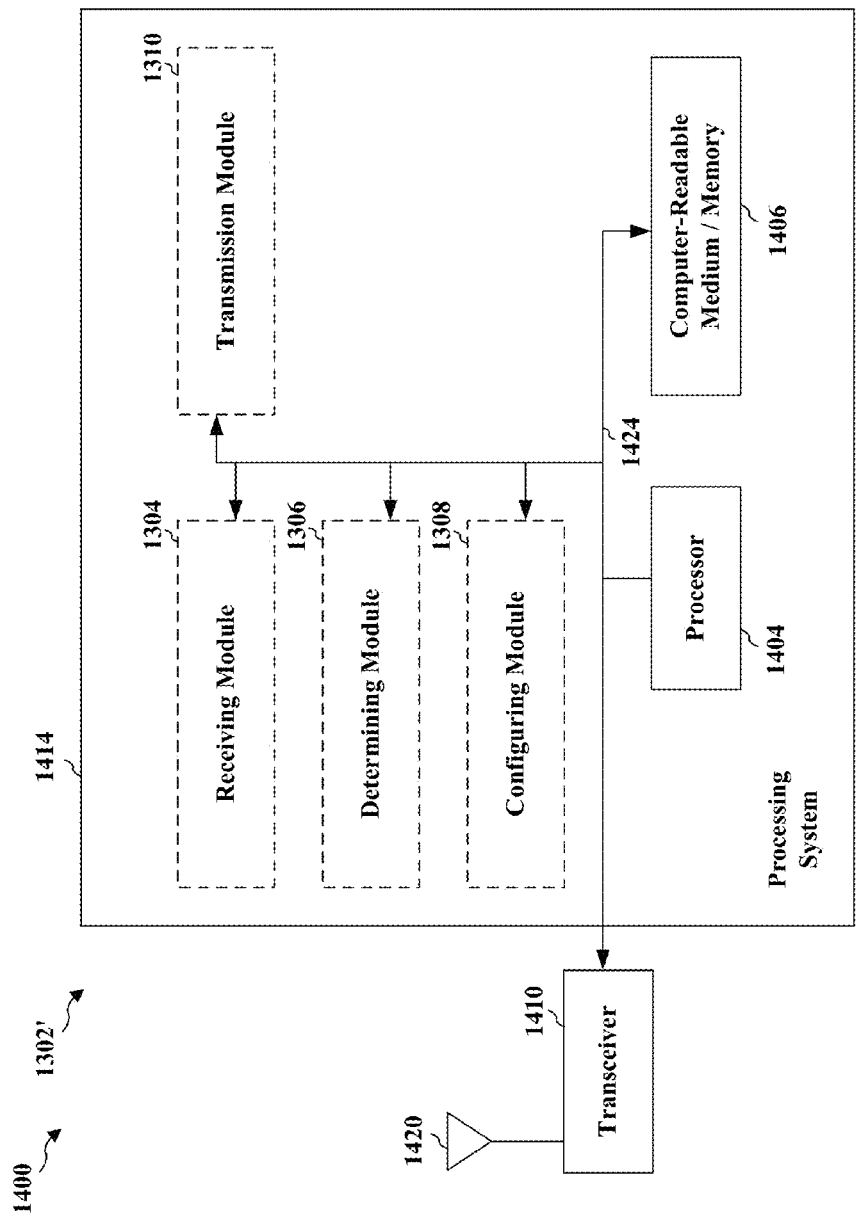
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, and 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1304. In addition, the transceiver 1410 receives information from the processing system 1414, specifically the transmission module 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, 1308, and 1310. The modules may be software modules running in the processor 1404, resident/stored in the computer readable medium/memory 1406, one or more hardware modules coupled to the processor 1404, or some combination thereof. The processing system 1414 may be a component of the transmission point 610 and may include the memory 676 and/or at least one of the TX processor 616, the RX processor 670, and the controller/processor 675.

In one configuration, the apparatus 1302/1302' for wireless communication includes means for configuring a first DL control channel for a UE being served by the first transmission point, the configuration facilitating decoding of the first DL control channel by at least one UE being served by a second transmission point, means for transmitting the first DL control channel, means for configuring a first PDSCH for the UE being served by the first transmission point, the first PDSCH comprising resources that are substantially aligned with resources of a second PDSCH for the at least one UE being served by the second transmission point, means for transmitting the first PDSCH, means for determining whether the at least one UE being served by the second transmission point is subject to interference from a first PDSCH of the UE being served by the first transmission point, and means for determining that the at least one UE being served by the second transmission point comprises a capability to decode the first DL control channel for the UE being served by the first transmission point. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 15:
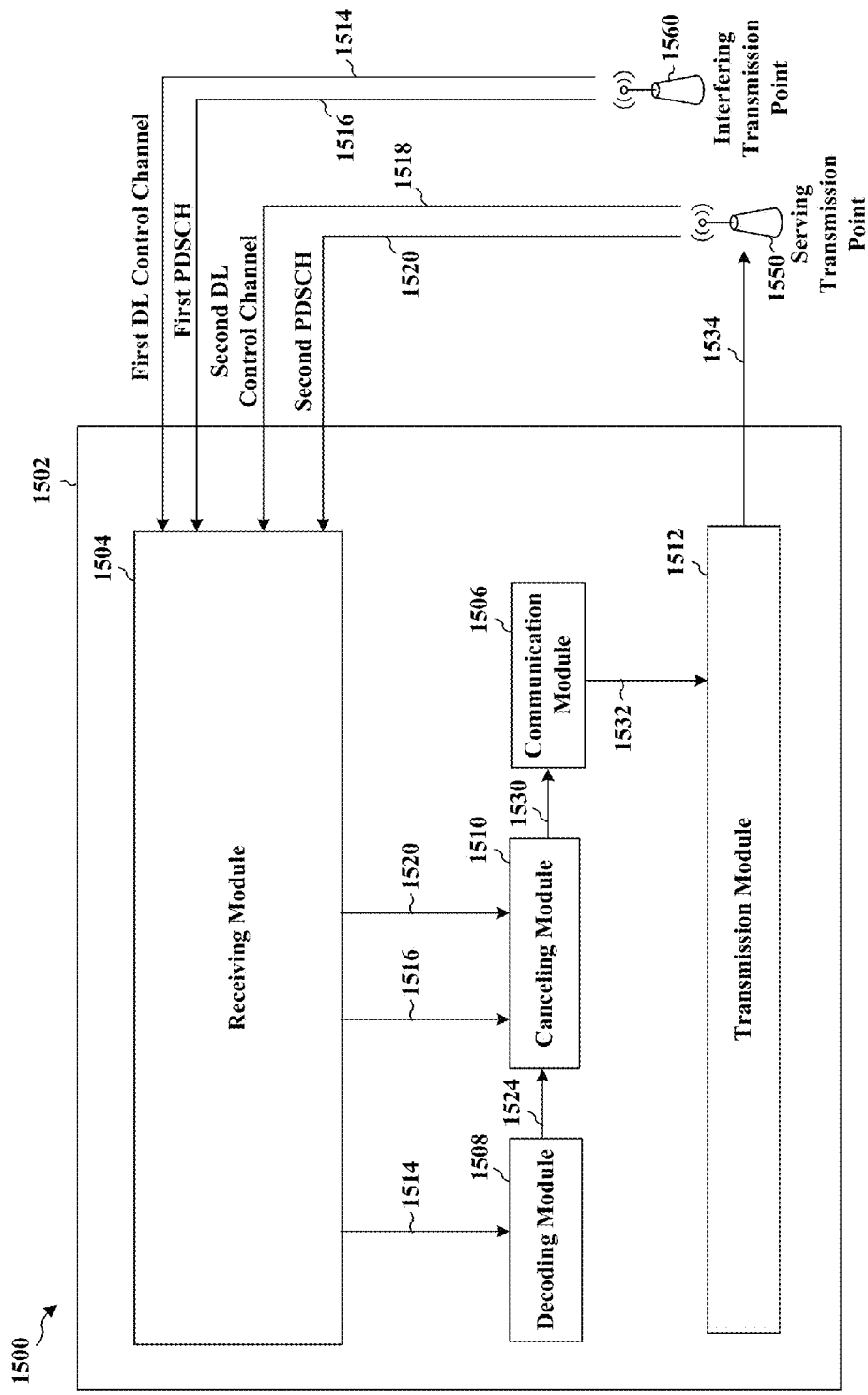
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE. The apparatus includes a receiving module 1504 that receives a first DL control channel 1514 and a first PDSCH 1516 from an interfering transmission point 1560 and further receives a second DL control channel 1518 and a second PDSCH 1520 from a serving transmission point 1550. The apparatus further includes a communication module 1506 that communicates with the serving transmission point 1550. In an aspect, the communication module 1506 processes DL signals (e.g., second DL control channel 1518 and second PDSCH 1520) from the serving transmission point 1550 and generates UL information 1532 for transmission 1534 to the serving transmission point 1550 via the transmission module 1512.

The apparatus further includes a decoding module 1508 that decodes the first DL control channel 1514 from the interfering transmission point 1560, where the first DL control channel 1514 is configured to facilitate the decoding of the first DL control channel by the apparatus. The decoding module 1508 provides the decoded first DL control channel 1524 to the cancelling module 1510. The cancelling module 1510 cancels an interference to the second PDSCH 1520 from the serving transmission point 1550 caused by the first PDSCH 1516 from the interfering transmission point 1560 based on the decoded first DL control channel 1524. The canceling module 1510 provides the interference canceled second PDSCH 1530 to the communication module 1506, which processes the second PDSCH to obtain data sent from the serving transmission point 1550.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
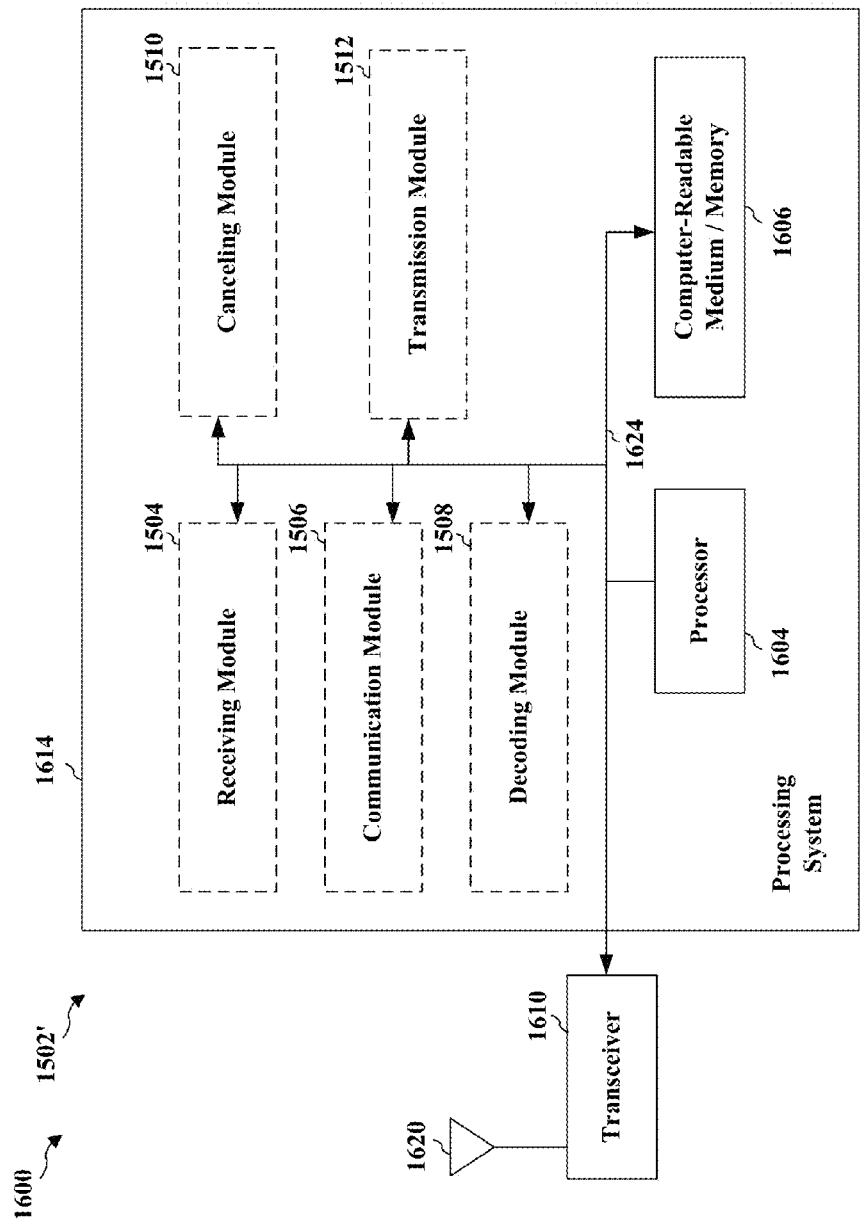
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, and 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1504. In addition, the transceiver 1610 receives information from the processing system 1614, specifically the transmission module 1512, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1506, 1508, 1510, and 1512. The modules may be software modules running in the processor 1604, resident/stored in the computer readable medium/memory 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for communicating with a serving transmission point, means for decoding a first DL control channel from an interfering transmission point, the first DL control channel being configured to facilitate the decoding of the first DL control channel by the UE, and means for canceling an interference caused by the interfering transmission point based on the decoded first DL control channel. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a first transmission point, comprising:
    configuring a first downlink (DL) control channel for a user equipment (UE) being served by the first transmission point, the configuration facilitating decoding of the first DL control channel by at least one interfered UE served by a second transmission point; and
    transmitting the first DL control channel, the first DL control channel comprising a downlink grant for the UE served by the first transmission point,
    wherein the configuring facilitates decoding of the downlink grant in the first DL control channel by the interfered UE, and wherein the configuring the first DL control channel comprises allocating a first number of resources for the first DL control channel, the first number of resources being equal to or greater than a second number of resources allocated to the at least one interfered UE by the second transmission point for a second DL control channel.

2. The method of claim 1, wherein the first transmission point is a first base station and the second transmission point is a second base station.

3. The method of claim 1, wherein the first and second transmission points share a same cell identifier (CID).

4. The method of claim 1, wherein:
    the configuring the first DL control channel comprises increasing a transmit power of the first DL control channel based on one or more radio conditions of the at least one interfered UE to enable detection of the first DL control channel by the at least one interfered UE, and
    the transmitting comprises transmitting the first DL control channel with the increased transmit power.

5. The method of claim 1, wherein the configuring the first DL control channel comprises allocating resources for the first DL control channel which are included in a search space monitored by the at least one interfered UE.

6. The method of claim 5, wherein the allocating resources for the first DL control channel further comprises selecting a UE that can be assigned to monitor a selected search space.

7. The method of claim 1, further comprising:
    configuring a first physical downlink shared channel (PDSCH) for the UE being served by the first transmission point, the first PDSCH comprising resources that are substantially aligned with resources of a second PDSCH for the at least one interfered UE being served by the second transmission point; and
    transmitting the first PDSCH.

8. The method of claim 1, wherein the DL grant comprised in the first DL control channel corresponds to a first physical downlink shared channel (PDSCH) that interferes with a second PDSCH for the at least one interfered UE being served by the second transmission point.

9. The method of claim 1, further comprising determining whether the at least one interfered UE being served by the second transmission point is subject to interference from a first physical downlink shared channel (PDSCH) of the UE being served by the first transmission point.

10. The method of claim 1, further comprising determining that the at least one interfered UE being served by the second transmission point comprises a capability to decode the first DL control channel for the UE being served by the first transmission point.

11. The method of claim 1, wherein the first DL control channel is an enhanced physical downlink control channel (EPDCCH), the configuring comprising configuring a first search space of the UE being served by the first transmission point to be same as a second search space of the at least one interfered UE being served by the second transmission point.

12. The method of claim 1, wherein the first DL control channel is an enhanced physical downlink control channel (EPDCCH), the configuring comprising configuring the EPDCCH to be transmitted with a first virtual cell identification (VCID) that is same as a second VCID used by the second transmission point.

13. A method of wireless communication for a user equipment (UE), comprising:
    communicating with a serving transmission point;
    decoding a first downlink (DL) control channel comprising a DL grant from an interfering transmission point for a second UE served by the interfering transmission point, the first DL control channel being configured to facilitate the decoding of the first DL control channel by the UE, and wherein the first DL control channel comprises an allocation of a first number of resources for the first DL control channel, the first number of resources being equal to or greater than a second number of resources allocated to the UE by the serving transmission point for a second DL control channel; and
    performing interference suppression for a transmission from the interfering transmission point to the second UE according to the DL grant based on the decoded first DL control channel.

14. The method of claim 13, wherein the serving transmission point is a first base station and the interfering transmission point is a second base station.

15. The method of claim 13, wherein the serving and interfering transmission points share a same cell identifier (CID).

16. A first transmission point for wireless communication, comprising:
    a memory; and
    at least one processor coupled to the memory and configured to:
        configure a first downlink (DL) control channel for a user equipment (UE) being served by the first transmission point, the configuration facilitating decoding of the first DL control channel by at least one interfered UE being served by a second transmission point; and
        transmit the first DL control channel, the first DL control channel comprising a downlink grant for the UE served by the first transmission point, wherein the configuring facilitates decoding of the downlink grant in the first DL control channel by the interfered UE, and wherein the configuring the first DL control channel comprises allocating a first number of resources for the first DL control channel, the first number of resources being equal to or greater than a second number of resources allocated to the at least one interfered UE by the second transmission point for a second DL control channel.

17. The method of claim 16, wherein the first transmission point is a first base station and the second transmission point is a second base station.

18. The method of claim 16, wherein the first and second transmission points share a same cell identifier (CID).

19. The first transmission point of claim 16, wherein:
the at least one processor is configured to configure the first DL control channel by increasing a transmit power of the first DL control channel based on one or more radio conditions of the at least one interfered UE to enable detection of the first DL control channel by the at least one interfered UE, and
the at least one processor is configured to transmit the first DL control channel by transmitting the first DL control channel with the increased transmit power.

20. The first transmission point of claim 16, wherein the at least one processor is configured to configure the first DL control channel by allocating resources for the first DL control channel which are included in a search space monitored by the at least one interfered UE.

21. The first transmission point of claim 20, wherein the at least one processor is configured to allocate resources for the first DL control channel by selecting a UE that can be assigned to monitor a selected search space.

22. The first transmission point of claim 16, the at least one processor further configured to:
configure a first physical downlink shared channel (PDSCH) for the UE being served by the first transmission point, the first PDSCH comprising resources that are substantially aligned with resources of a second PDSCH for the at least one interfered UE being served by the second transmission point; and
transmit the first PDSCH.

23. The first transmission point of claim 16, wherein the DL grant comprised in the first DL control channel corresponds to a first physical downlink shared channel (PDSCH) that interferes with a second PDSCH for the at least one interfered UE being served by the second transmission point.

24. The first transmission point of claim 16, the at least one processor further configured to determine whether the at least one interfered UE being served by the second transmission point is subject to interference from a first physical downlink shared channel (PDSCH) of the UE being served by the first transmission point.

25. The first transmission point of claim 16, the at least one processor further configured to determine that the at least one interfered UE being served by the second transmission point comprises a capability to decode the first DL control channel for the UE being served by the first transmission point.

26. The first transmission point of claim 16, wherein the first DL control channel is an enhanced physical downlink control channel (EPDCCH), the configuring comprising configuring a first search space of the UE being served by the first transmission point to be same as a second search space of the at least one interfered UE being served by the second transmission point.

27. The first transmission point of claim 16, wherein the first DL control channel is an enhanced physical downlink control channel (EPDCCH), the configuring comprising configuring the EPDCCH to be transmitted with a first virtual cell identification (VCID) that is same as a second VCID used by the second transmission point.

28. A user equipment (UE) for wireless communication, comprising:
a memory; and
at least one processor coupled to the memory and configured to:
communicate with a serving transmission point;
decode a first downlink (DL) control channel comprising a DL grant from an interfering transmission point for a second UE served by the interfering transmission point, the first DL control channel being configured to facilitate the decoding of the first DL control channel by the UE, and wherein the first DL control channel comprises an allocation of a first number of resources for the first DL control channel, the first number of resources being equal to or greater than a second number of resources allocated to the UE by the serving transmission point for a second DL control channel; and
perform interference suppression for a transmission from the interfering transmission point to the second UE according to the DL grant based on the decoded first DL control channel.

* * * * *